United States Patent [19]

Oswalt

[11] 4,352,253
[45] Oct. 5, 1982

[54] LIVESTOCK IDENTIFICATION SYSTEM
[76] Inventor: William L. Oswalt, 5316 E. W Ave., Vicksburg, Mich. 49097
[21] Appl. No.: 243,549
[22] Filed: Mar. 13, 1981
[51] Int. Cl.³ .............................................. G09F 3/00
[52] U.S. Cl. ..................... 40/300; 119/106; 40/21 C
[58] Field of Search ............... 40/586, 21 R, 21 C, 40/300, 303, 304; 119/106; 24/16 R, 17 R

[56] References Cited

U.S. PATENT DOCUMENTS

| | | | |
|---|---|---|---|
| 1,803,196 | 4/1931 | Mader | 40/303 |
| 2,497,632 | 2/1950 | Schacht | 40/300 |
| 2,648,150 | 8/1953 | Sullivan | 40/10 |
| 2,956,361 | 10/1960 | Hall | 40/21 R |
| 3,063,718 | 11/1962 | Steinkamp | 273/55 |
| 3,360,877 | 1/1968 | Estep | 40/300 |
| 3,484,974 | 12/1969 | Culmone | 40/586 |
| 3,650,058 | 3/1972 | Wittcke et al. | 40/300 |
| 3,782,017 | 1/1974 | Graham | 40/300 |
| 4,178,879 | 11/1979 | Chao et al. | 119/106 |
| 4,178,879 | 12/1979 | Cunningham | 119/106 |
| 4,184,452 | 1/1980 | Buzzell | 119/106 |
| 4,249,268 | 2/1981 | Berler | 40/586 |

Primary Examiner—Gene Mancene
Assistant Examiner—Wenceslao J. Contreras
Attorney, Agent, or Firm—Varnum, Riddering, Wierengo & Christenson

[57] ABSTRACT

An animal marking system for cattle and the like comprises a flexible strap (14) designed to be secured around the neck of an animal. One set of patches (22) bearing numbers and another set of patches (20) bearing a color are replaceably secured at two separate locations to the strap (14) so that the numbers and colors are clearly visible from a distance and from each of the two sides of the animal. The system includes sets of patches (20) bearing different identifiable colors to indicate the condition of the cow with respect to health, breeding condition or lactation. The patches are secured to the sides of the strap through a Velcro fastening system.

11 Claims, 3 Drawing Figures

LIVESTOCK IDENTIFICATION SYSTEM

BACKGROUND OF THE INVENTION

1. Technical Field

This invention relates to animal marking systems. In one of its aspects, the invention relates to an animal marking system having replaceable and reusable marking indicia visible from each side of the animal.

2. Background Art

In modern diary herd management, animal marking systems are important to keep accurate records of each animal from the time it is acquired to the time it is removed from the herd. Currently, it is conventional to assign to each animal in the herd an identification number and to apply such number to a tag which is worn by the animal at the brisket or at the base of the lower neck. Records of the ancestry of each animal and current records as to lactation condition and gestation cycles of each animal are also kept. With this system, one must approach the animal and perhaps come within arm's length of the animal in order to read the identification tag. With a herd of 50–100 animals, the process of finding a particular animal or for identifying a particular animal in a herd is tedious and time consuming. Further, the current identification tags do not indicate the gestation and lactation or health conditions of the animal.

The U.S. patent to Estep, U.S. Pat. No. 3,360,877, issued Aug. 11, 1953, discloses a marking system for an animal wherein a tag secured to the animal through a chain around the animal's neck has applied thereto pressure-sensitive tape with numerals.

The patent to Wittcke et al. U.S. Pat. No. 3,650,058, issued Mar. 21, 1972, discloses an animal marking and identification tag for farm animals wherein the tag comprising a flat, plastic body bears a permanent identification of the animal and has a window behind which a rotatable disc with a number is displayed. The number is used to indicate variable conditions or requirements such as the amount of food to be apportioned to the cow during milking periods. Further, a set of pegs with distinctively-shaped and/or color heads and with shanks removably received in openings of the plate indicate data on recurring events such as breeding. The tags apparently are distroyed when removed from the plate openings. The tag is said to be affixed to the neck strap or a skin-fold of the cow.

The problem with both the Estep and Wittcke systems is that the tags are usually visible only in close proximity to the animal and then only from one orientation, namely from directly in front of the animal. Further distruction of the color-coded pegs when the cow's condition changes is undesirable.

DISCLOSURE OF INVENTION

According to the invention, an animal marking system is provided which is readily visible from both sides of the animal and from a considerable distance from the animal. The marking system is easily changed to accommodate different conditions of the animal without destruction of the marking indicia and all parts can be reused when the animal is removed from the herd.

The animal marking system according to the invention comprises a flexible strap having two ends of a length sufficient to fit around the neck of the animal and means for adjustably fastening the ends of the strap to form a loop of adjustable diameter to secure the strap around the animal's neck. At least one pair of first patches bearing numbers and two sets of second patches having different identifiable colors are provided. Means are provided for removably securing the at least one pair of first patches and a pair of identically colored second patches to the flexible strap at two separate locations on the strap such that the first and second patches will be positioned on opposite sides of the loop formed by the strap when the loop is positioned around the animal's neck. By this system the first and second patches are both visible from opposite sides of the animal when the strap is positioned on the animal. The fastening means has sufficient weight so that it will remain beneath the animal's neck to maintain the first and second patches at the side of the neck.

The means for securing the patches to the animal advantageously are a Velcro system wherein a plurality of resiliently deformable hook-shaped elements are used on either the strap or the patches and a plurality of loop elements are secured to the other of the flexible strap and first and second patches. The resiliently deformable hook-shaped elements internally engage the loop elements when the hook-shaped elements are pressed against the looped elements.

Preferably, the flexible strap is made of a woven material such as heavy polypropylene webbing. Other materials such as leather can also be used. The strap typically will be in the nature of a belt and accordingly be 1–3 inches in width.

The ends of the strap are affixed with a buckle. In a preferred embodiment, the buckle is formed with a rectangular-shaped ring and two slide clasps through which the ends of the strap are looped to adjust and secure the strap around the animal's neck.

The sets of second patches having identifiable colors preferably comprise from three to seven distinctly different colors. In a preferred embodiment of the invention there are five colors in each set of second patches. The colors can be red, yellow, blue, green and orange. Preferably, the colors are different from the color of the strap and the color of the first patches bearing numbers. The colors of black and white for the second patches are not desirable.

The first patches bearing the numbers have numbers of a size to be visible by the naked eye from at least forty feet. Typically, the one number will be on each patch and the numbers are designed to be vertically aligned with each other when multiple numbers are used.

Preferably, the first and second patches are of a substantial size, typically the width of the strap so that the patches are visible from a considerable distance.

Typically, the system includes a plurality of flexible straps, at least one for each animal in the herd, a plurality of pairs of first patches, each having a different number so that each animal in the herd bears a different number and a plurality of sets of second patches. There can be approximately twice as many sets of second patches as there are straps so that each animal may have the same or a different color coding. Statistically, however, it is unlikely that each animal will have the same color coding at the same time and accordingly the number of sets of color patches can be reduced to approximately the number of straps provided in the system.

BRIEF DESCRIPTION OF DRAWINGS

The invention will now be described with reference to the accompanying drawings in which.

BEST MODE FOR CARRYING OUT THE INVENTION

Figure 1:
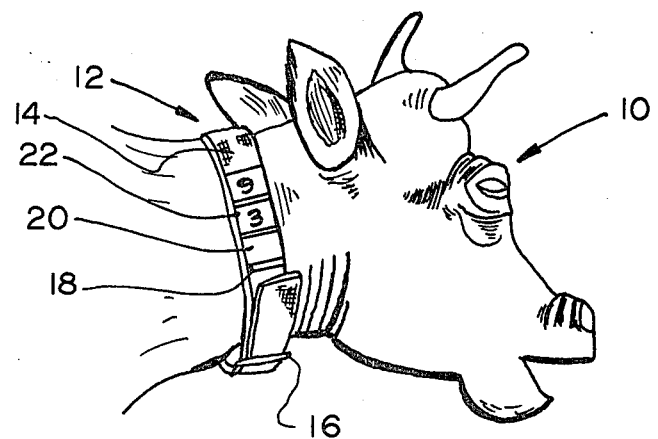
FIG. 1 is a perspective view of an animal head and neck with a marking system according to the invention around the animal neck.
Figure 2:
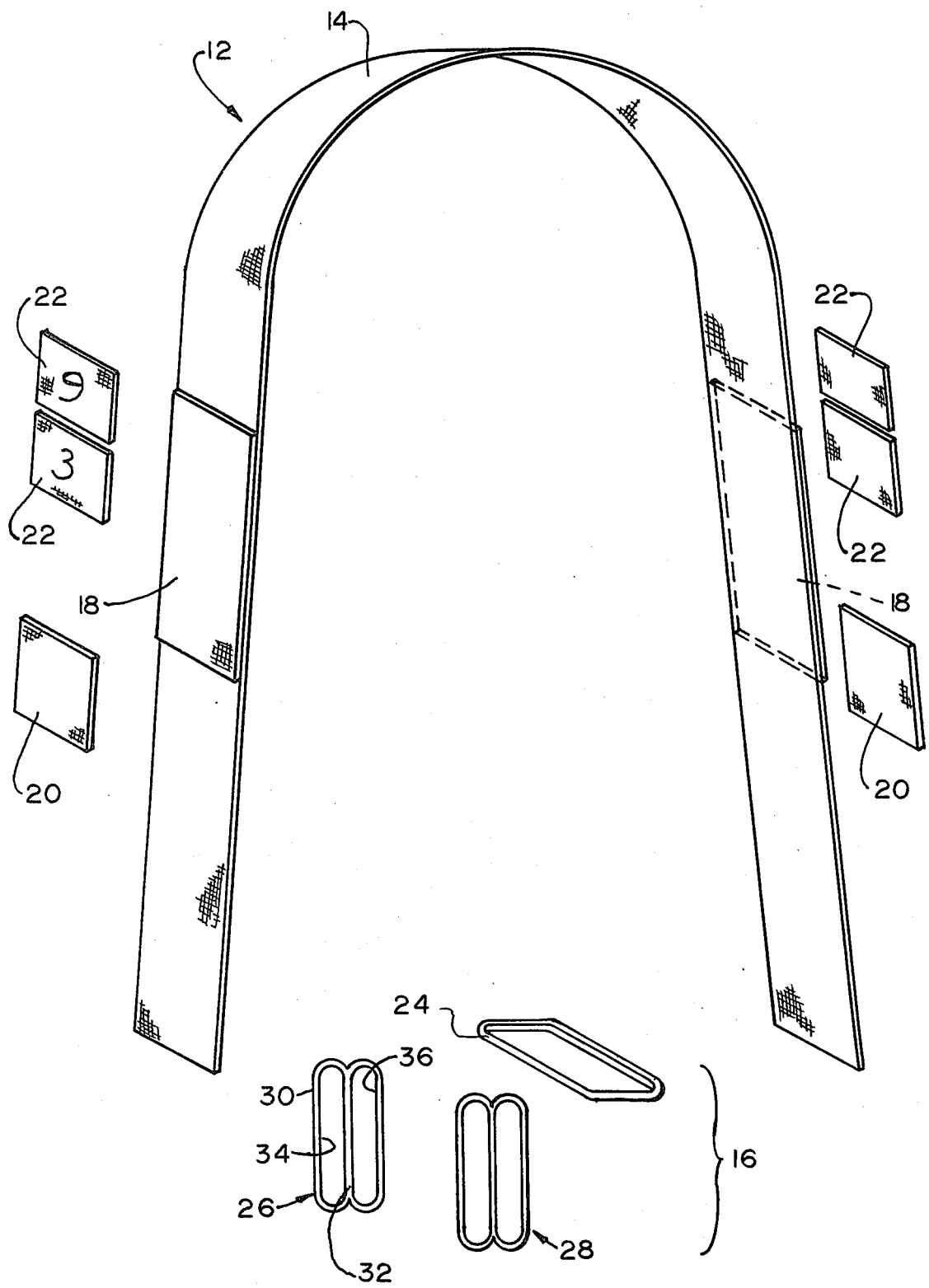
FIG. 2 is an exploded view of the marking system according to the invention.

Referring now to the drawings, and to FIGS. 1 and 2 in particular, there is shown an animal head and neck 10 having a marking system 12 around the animal's neck. The marking system includes a flexible, woven polypropylene strap 14 which is secured at its ends through a rectangular ring and two slide buckle assembly 16. A Velcro loop pile strip 18 is secured at two separate locations to the polypropylene strap 14 through sewing or adhesives in such a manner that the pile strip will be clearly visible at each side of the animal neck. A color-coded Velcro hook patch 20 is positioned and secured by the Velcro fastener system onto each of the Velcro loop pile strips 18. Further, numbered Velcro hook patches 22 are secured by the Velcro fastener system also to each of the Velcro loop pile strips 18. The buckle assembly 16 comprises a rectangular ring 24 and two slides 26 and 28 respectively. Each of the slides 26 and 28 have an outer ring 30 and a vertical central web 32, leaving openings 34 and 36.

Figure 3:
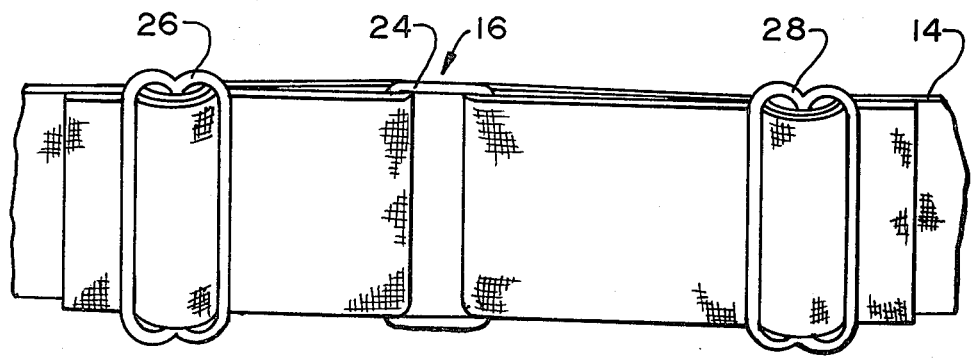
FIG. 3 is a perspective view of the buckle used to fasten the strap in the marking system illustrated in FIGS. 1 and 2.

With reference to FIG. 3, the ends of the strap 14 are fastened together by threading each of the ends of the strap through the center of both openings 34 and 36 of a slide 26 and 28, then through the rectangular ring 24 and then back through the openings 34 and 36 of the slides 26 and 28 as shown.

The invention provides a method for easily attaching the marking system to the animal in a convenient location and further provides a system for displaying both the number and the color code of the animal so that both can be seen from distances of forty to one hundred feet or more and from each side of the animal. The number and the color coding are clearly visible on the animal. The color coding can be changed from time to time by simply pulling off the color coding and by putting a new color patch 20 onto the Velcro loop pile strip 18. Similarly, in the event that the animal is sold or processed, the strap can be reused by removing the old numbers and adding new numbers or the same numbers can be used. In any case, the numbers are easily attached and removed to the pile loop.

The system thus comprises one or more straps adapted for securing around the animal's neck, each strap having a buckle and two Velcro loop pile strips secured thereto, a plurality of Velcro hook patches containing different numbers, and a plurality of Velcro hook patches containing sets of different colors. Typically, five sets of colors are used on the colored hook patches 20. The colors can represent, for example, bred, open, dry, pregnant and treated conditions.

Although the system has been described as having a Velcro loop strip secured to the strap 14 and the Velcro hooks on the patches 20 and 22, the Velcro system can be reversed, i.e. with a Velcro hook strip secured to the strap and the patches 20 and 22 formed with Velcro loop structure. Further, although a specific fastener structure has been shown for the strap, other fastener systems, such as conventional buckles, can also be used in accordance with the invention.

Reasonable variations and modifications are possible within the scope of the foregoing specification and drawings without departing from the spirit of the invention which is defined in the appended claims.

The embodiments of the invention in which an exclusive property or privilege is claimed are defined as follows:

1. An animal marking system for cattle and the like comprising:
   a flexible strap having two ends and of a length sufficient to fit around the neck of an animal;
   means for adjustably fastening the ends of the strap to form a loop of adjustable diameter to secure the strap around the animal's neck;
   at least one pair of first patches bearing identical numbers;
   two sets of second patches having a surface of a different identifiable color;
   means for removably securing each of the at least one pair of first patches and a pair of second patches to the flexible strap at two separate locations on the strap such that the first and second patches will be positioned on opposite sides of the loop formed by the strap when the loop is positioned around an animal's neck, whereby the first and second patches are both visible from opposite sides of an animal when the strap is positioned on the animal; and
   the removably securing means comprises:
   a plurality of resiliently deformable hook-shaped elements secured to one of the flexible strap and the first and second patches; and
   a plurality of loop elements secured to the other of the flexible strap and the first and second patches, the resiliently deformable, hook-shaped elements internally engaging the loop elements when the hook-shaped elements are pressed against the loop elements.

2. An animal marking system according to claim 1 wherein the flexible strap is formed of a woven material.

3. An animal marking system according to claim 1 wherein the fastening means comprises a rectangular-shaped ring and two slide members.

4. An animal marking system according to claim 1 wherein each set of said second patches has three to seven distinctively different colors.

5. An animal marking system according to claim 1 wherein each set of said second patches has five distinctively different colors.

6. An animal marking system according to claim 1 wherein the numbers on the first patches are of a size to be visible to the naked eye from at least forty feet away.

7. An animal marking system according to claim 1 wherein the first and second patches are of a width approximately equal to the width of the strap.

8. An animal marking system according to claim 1 wherein there is provided a plurality of said flexible straps, a plurality of said first patches, pairs of each having the same number, and a plurality of said sets of second patches.

9. An animal marking system according to claim 8 wherein there are approximately half as many straps and pairs of first patches.

10. An animal marking system according to claim 9 wherein there are approximately twice as many sets of second patches as straps.

11. An animal marking system according to claim 8 wherein there are approximately twice as many sets of second patches as straps.

* * * * *